Patented Nov. 25, 1924.

1,517,003

UNITED STATES PATENT OFFICE.

HANS HAHL AND WALTER KROPP, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND CONSISTING OF THE SODIUM-VANADIUM SALT OF TRIGLYCOLLAMIC ACID.

No Drawing.   Application filed February 14, 1924.   Serial No. 692,881.

*To all whom it may concern:*

Be it known that we, HANS HAHL and WALTER KROPP, citizens of Germany, residing at Elberfeld, State of Prussia, Germany, have invented new and useful Improvements in Pharmaceutical Compound Consisting of the Sodium-Vanadium Salt of Triglycollamic Acid, of which the following is a specification.

The present invention concerns the production of the hitherto unknown compound of the trivalent vanadium with triglycollamic acid. The compound has proved to be a valuable remedy against syphilis.

In order to illustrate the new invention the following example is given:—

20 parts by weight of triglycollamic acid of the formula: $N(CH_2-COOH)_3$ are mixed with a solution of 11 parts by weight of anhydrous sodium carbonate in 60 parts by weight of water, 5 parts by weight of vanadium oxide $V_2O_3$ are added and the mixture is heated until it is neutral. The liquid is evaporated to dryness. The complex sodium-vanadium salt of the triglycollamic acid having most probably the formula:

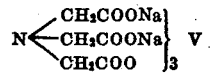

is thus obtained in the form of a brownish amorphous compound, soluble in water with a yellow coloration which soon turns green. The solutions can be kept without decomposition. They are colored blue by the addition of a mineral acid.

We claim:—

The herein described new complex sodium-vanadium salt of triglycollamic acid, being a brownish amorphous compound soluble in water with a yellow coloration soon turning green, which solution is colored blue by the addition of a mineral acid, and being a valuable remedy against syphilis, substantially as described.

In testimony whereof we have hereunto set our hands.

HANS HAHL.
WALTER KROPP.